United States Patent
Hayashi et al.

(10) Patent No.: US 6,507,466 B1
(45) Date of Patent: Jan. 14, 2003

(54) MAGNETORESISTIVE EFFECT HEAD WITH DIODE IN PARALLEL

(75) Inventors: Kazuhiko Hayashi, Tokyo (JP); Keishi Ohashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/556,335

(22) Filed: Apr. 24, 2000

(30) Foreign Application Priority Data

Apr. 22, 1999 (JP) ............................................ 11-115105

(51) Int. Cl.⁷ .............................. G11B 5/39; G11B 5/40
(52) U.S. Cl. ..................................................... 360/323
(58) Field of Search .............................. 360/323, 324.1, 360/324.2, 128

(56) References Cited

U.S. PATENT DOCUMENTS

| | | | | |
|---|---|---|---|---|
| 5,748,412 A | * | 5/1998 | Murdock et al. | 360/323 |
| 5,757,590 A | * | 5/1998 | Phipps et al. | 360/128 |
| 5,757,591 A | * | 5/1998 | Carr et al. | 360/323 |
| 5,903,415 A | * | 5/1999 | Gill | 360/75 |
| 6,081,409 A | * | 6/2000 | Hughbanks et al. | 360/128 |
| 6,163,437 A | * | 12/2000 | Inage et al. | 360/128 |
| 6,233,127 B1 | * | 5/2001 | Shimazawa | 360/323 |
| 6,288,880 B1 | * | 9/2001 | Hughbanks et al. | 360/323 |

FOREIGN PATENT DOCUMENTS

| | | |
|---|---|---|
| JP | 3-57705 | 6/1991 |
| JP | 6-103508 | * 4/1994 |
| JP | 7-169005 | 7/1995 |
| JP | 9-288805 | 11/1997 |
| JP | 10-255235 | 9/1998 |
| JP | 2000-76626 | * 3/2000 |

OTHER PUBLICATIONS

Thompson, et al. "Thin Film Magnetoresistors in Memory, Storage, and Related Applications," IEEE Trans on Magnetics MAG–11 No. 4, 1975, PP. 1039–1051.

Abstracts for the 43rd Annual Conference on Magnetism & Magnetic Materials, Miami, Florida, Nov. 1998, P.170 EB–09.

* cited by examiner

Primary Examiner—Jefferson Evans
(74) Attorney, Agent, or Firm—McGinn & Gibb, PLLC

(57) ABSTRACT

In a magnetoresistive effect head in which a magnetoresistive effect element made from either a ferromagnetic tunnel junction film or a spin valve film is formed as a magnetoresistive sensor, a diode is connected in parallel with a first and a second electrode of the magnetoresistive effect element.

10 Claims, 6 Drawing Sheets

1: Si GROWTH→n-TYPE ION IMPLANTATION

2: PR FORMATION→MILLING→PR REMOVAL

3: PR FORMATION→p-TYPE ION IMPLANTATION

4: PR REMOVAL

5: PR FORMATION→INSULATION LAYER FORMATION→LIFT-OFF

6: PR FORMATION→ELECTRODE FORMATION→LIFT-OFF

7: PR FORMATION→ELECTRODE FORMATION→LIFT-OFF

MAGNETORESISTIVE EFFECT HEAD WITH DIODE IN PARALLEL

BACKGROUND OF THE INVENTION

1. Field of the Invention

The present invention relates to a magnetoresistive effect head and to a method for manufacturing a magnetoresistive effect head.

2. Description of Related Arts

In the prior art, there has been disclosure of a magnetic reading transducer known as a magnetoresistive (MR) sensor or head, and this was known to be capable of reading data from a magnetic surface with a high linear density.

This type of MR sensor detects a magnetic field signal by means of a change in resistance as a function of the strength and direction of magnetic flux detected by a reading element.

Such an MR sensor operates on the principle of anisotropic magnetic resistance (AMR), which varies in proportion to the square of the cosine of the angle between the direction of magnetization of one component of the resistance of the reading element and the direction of the sensed current flowing in the element.

A detailed description of the AMR effect is found in D. A Thompson et al, "Memory Storage and Related Applications," IEEE Trans. on Magnetics, MAG-11, p 1039 (1975).

In a magnetic head that uses the AMR effect, to suppress Barkhausen noise, vertical bias is often applied. The vertical bias application material is sometimes an anti-ferromagnetic material such as FeMn, NiMn, or nickel oxide or the like.

Recently, there has been a report of a more prominent magnetoresistive effect attributed to spin-dependent conduction of conduction electrons between magnetic layers with non-magnetic layers therebetween, and an accompanying spin-dependent disturbance in the surface boundary.

This magnetoresistive effect is known variously as the giant magnetoresistive effect and the spin valve effect. Such a magnetic sensor is made of an appropriate material and has improved sensitivity and larger resistance change than sensors that use the AMR effect.

In this type of MR sensor, the planar resistance between a pair of magnetic layers separated by a non-magnetic layer varies in proportion to the cosine of the angle between the magnetization in the two layers.

In the Japanese Unexamined Patent Publication (KOKAI) No. 2-61572, having a claimed priority date of June 1988, there is language with regard to a laminated magnetic structure that imparts a large MR change occurring due to anti-parallel alignment of magnetization within a magnetic layer. In the above-cited specification, a ferromagnetic transition metal and alloy are given as a material usable as in the laminated structure.

Additionally, there is disclosure of a structure in which there is an added layer fixed to at least one of two magnetic layers separated by an intermediate layer and a disclosure that FeMn is suitable for the fixed layer.

In the Japanese Unexamined Patent Publication (KOKAI) No. 4-358310, having a claimed priority day of December 11, 1990, there is disclosure of an MR sensor that is independent of the direction of current flowing therewithin, having two thin-film layers of ferromagnetic material separated by a non-magnetic metal layer, wherein when an applied magnetic field is zero the magnetization directions of the two ferromagnetic layers intersect perpendicularly, the resistance of the two non-linked magnetic layers varying in proportion to the cosine of the angle between the magnetization directions of the two layers.

In the Japanese Unexamined Patent Publication (KOKAI) No. 4-103014, the application for which was filed on Aug. 22, 1990, there is language describing a ferromagnetic tunnel effect film in a multilayer ferromagnetic tunnel junction element in which an intermediate layer is interposed between ferromagnetic layers, wherein a bias magnetic field is applied to at least one of the ferromagnetic layers from an anti-ferromagnetic body.

Shielded spin-valve head and shielded TMR head of the past exhibited great deterioration under excessive current conditions. (Refer to, for example, Abstracts for the 43rd Annual Conference on Magnetism & Magnetic Materials, Miami, Fla., November 1998, p. 170 EB-09.)

Table 1 shown below presents the results of an MR ratio EDD electrostatic discharge test, performed by the inventors and others, with regard to a shielded AMR head, a shield-type spin valve head, and a shielded TMR head.

A human body model was used in the above-noted test, which was performed using a known test apparatus.

A 100-pF ceramic capacitor was used as a capacitor to impart an electrical charge to the above-noted samples, a 1500Ω resistance being inserted between the head (device under test) and the capacitor.

First, a charge was stored in the capacitor using a voltage-application apparatus (HV power supply), after which a switch was switched to the head so as to apply the charge to the head, the R-H loop before and after these events being measured.

With the AMR head, while there was no observed drop in the MR ratio up until a high ESD voltage of 60 volts, with the spin valve head and there was an observed drop in the MR ratio at 25 volts, and with the TMR head, there was a drop observed in the MR ratio at just 1 volt.

This is because in contrast to the magnetically sensitive part of the AMR head, which was a NiFe alloy, that exhibits a drop in the MR ratio when the element temperature is raised by the ESD current to the 660° C., which is the Curie temperature of the NiFe alloy, in the spin valve head, even if the Brocking temperature of the anti-ferromagnetic layers is high, this is approximately 350° C., and when this temperature is exceeded there is a drop in the MR ratio, resulting in a drop in the MR ratio at a lower ESD current and ESD voltage than in the AMR head.

In the case of the TMR head, the element breakdown mode by the ESD voltage is different, the ESD voltage being established by the withstand voltage of the barrier layer, and with current elements, the ESD voltage is approximately 1 V.

TABLE 1

MR Ratio ESD Withstand Voltages for Shielded AMR,
Spin Valve, and TMR Heads

| ESD Voltage (V) | AMR (%) | Spin Valve (%) | TMR (%) |
|---|---|---|---|
| 0 | 0.8 | 1.7 | 2.4 |
| 0.5 | 0.8 | 1.7 | 2.4 |
| 0.8 | 0.8 | 1.7 | 2.4 |
| 1 | 0.8 | 1.7 | 2.4 |
| 2 | 0.8 | 1.7 | 0 |

TABLE 1-continued

MR Ratio ESD Withstand Voltages for Shielded AMR,
Spin Valve, and TMR Heads

| ESD Voltage (V) | AMR (%) | Spin Valve (%) | TMR (%) |
| --- | --- | --- | --- |
| 5 | 0.8 | 1.7 | 0 |
| 8 | 0.8 | 1.7 | 0 |
| 10 | 0.8 | 1.7 | 0 |
| 15 | 0.8 | 1.7 | 0 |
| 20 | 0.8 | 1.7 | 0 |
| 25 | 0.8 | 1.7 | 0 |
| 30 | 0.8 | 0.7 | 0 |
| 60 | 0.8 | 0 | 0 |
| 65 | 0.3 | 0 | 0 |
| 70 | 0 | 0 | 0 |

A head is generally subjected to slider processing, is adhered to a suspension, and connected by wiring before shipping, this wiring acting as an antenna, which picks up stray electromagnetic radiation, thereby causing a current to flow.

This current has the same effect as the current that flows in the head during the ESD test, and can destroy the head.

Even after mounting is such equipment as hard disk drives, an excessive sense current can be momentarily imparted because of equipment noise or radiated noise and the like, and this type of excessive current can also destroy the head. Thus, strength exhibited in the ESD test is equivalent to immunity to damage from these types of externally introduced noise.

In the Japanese Unexamined Patent Publication (KOKAI) No. 6-103508 and in Japanese Patent No. 2784460, although there is disclosure of technology for connecting a diode in parallel with a magnetoresistive effect head, in these documents there is no disclosure that can be seen therein with regard to technology for solving the problem of a drop in the MR ratio, which occurs in an SDE test of a magnetoresistive effect head, especially in a magnetoresistive effect element made of a ferromagnetic tunnel junction film or a spin valve film, this occurring at a SDE voltage condition that is lower than a magnetoresistive effect element using AMR, nor is there any disclosure of technology for simplifying the manufacturing process therefor.

Next, in the Japanese Unexamined Patent Publication (KOKAI) No. 4-103014, there is language with regard to technology for applying a bias magnetic field with respect to a magnetic layer in a magnetoresistive effect element. However, there is no disclosure of technology for solving the problem of a drop in the MR ratio, which occurs in an SDE test of a magnetoresistive effect head, this occurring at a SDE voltage condition that is much lower than a magnetoresistive effect element using AMR.

Additionally, in both Japanese Patent No. 2651015 and the Japanese Unexamined Patent Publication (KOKAI) No. 8-21166, while there is language with regard to the structure of a magnetic sensor, there is no disclosure to be seen with regard to technology required to solve the problem of a drop in the MR ratio, which occurs in an SDE test of a magnetoresistive effect head, this occurring at a SDE voltage condition that is lower than a magnetoresistive effect element using AMR.

Accordingly, it is an object of the present invention, to improve on the above-noted drawbacks in the prior art, by providing a spin valve and ferromagnetic tunnel junction head with superior ESD immunity.

SUMMARY OF THE INVENTION

In order to achieve the above-noted object, the present invention has the following technical constitution.

Specifically, a first aspect of the present invention is a magnetoresistive effect head which uses as a magnetic resistance sensor a magnetoresistive effect element made from either a ferromagnetic tunnel junction film or a spin valve film, wherein a diode is provided to be connected to in parallel with a first electrode and a second electrode of the magnetoresistive effect element.

A second aspect of the present invention is a method for manufacturing a magnetoresistive effect head, whereby a magnetoresistive effect element that is either a ferromagnetic tunnel junction film or a spin valve film is formed onto a magnetic head substrate, and a diode is formed buried into the magnetic head substrate, after which the diode is connected in parallel with a first electrode and a second electrode of the magnetoresistive effect element.

Because a magnetoresistive effect head according to the present invention adopts the above-noted technical constitution, it solves the problem occurring particularly in the past, in which there is a reduction in the MR ratio in the SDE test of a magnetoresistive effect element made of a ferromagnetic tunnel junction film and a spin valve film, this effect occurring at an SDE voltage condition that is lower than with a magnetoresistive effect element using an AMR, the result being that even in a magnetoresistive effect head made of a magnetoresistive effect head element formed by a ferromagnetic tunnel junction film and a spin valve film, it is possible to achieve an SDE voltage equivalent to that of a magnetoresistive effect head using the anisotropic magnetoresistance (AMR) effect, and it is further possible to simplify the process of fabricating the magnetoresistive effect head.

BRIEF DESCRIPTIONS OF THE DRAWINGS

FIGS. 4(A) to 4(G) are a set of plan views illustrating the main process steps of a method for manufacturing a diode used in a magnetoresistive effect head according to the present invention.

Figure 3:
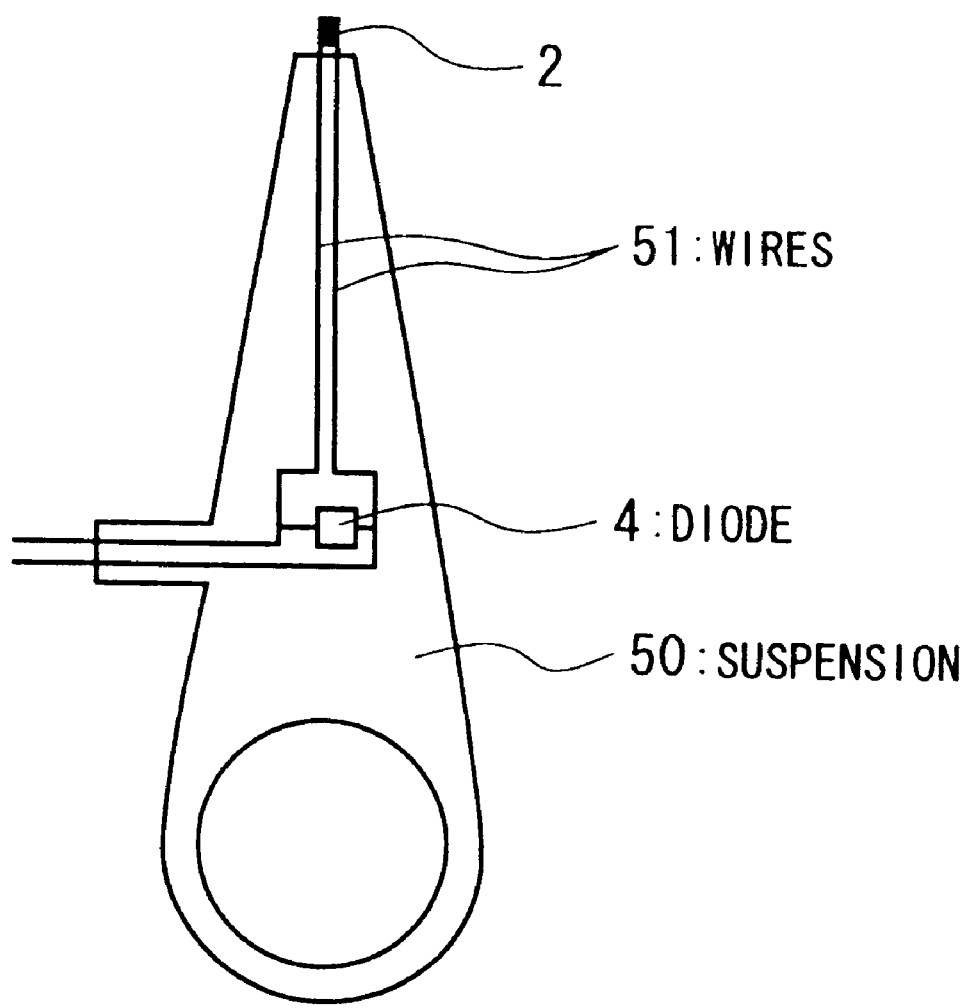
FIG. 3 is a plan view illustrating the configuration of another example of a magnetoresist effect head according to the present invention.
Figure 5:
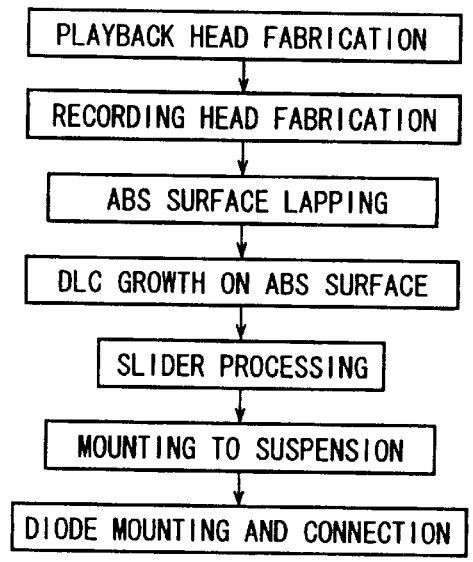

FIG. 5 is a flowchart illustrating the method for manufacturing the other example of a magnetoresistive effect head according to the present invention shown in FIG. 3.

Figure 6:
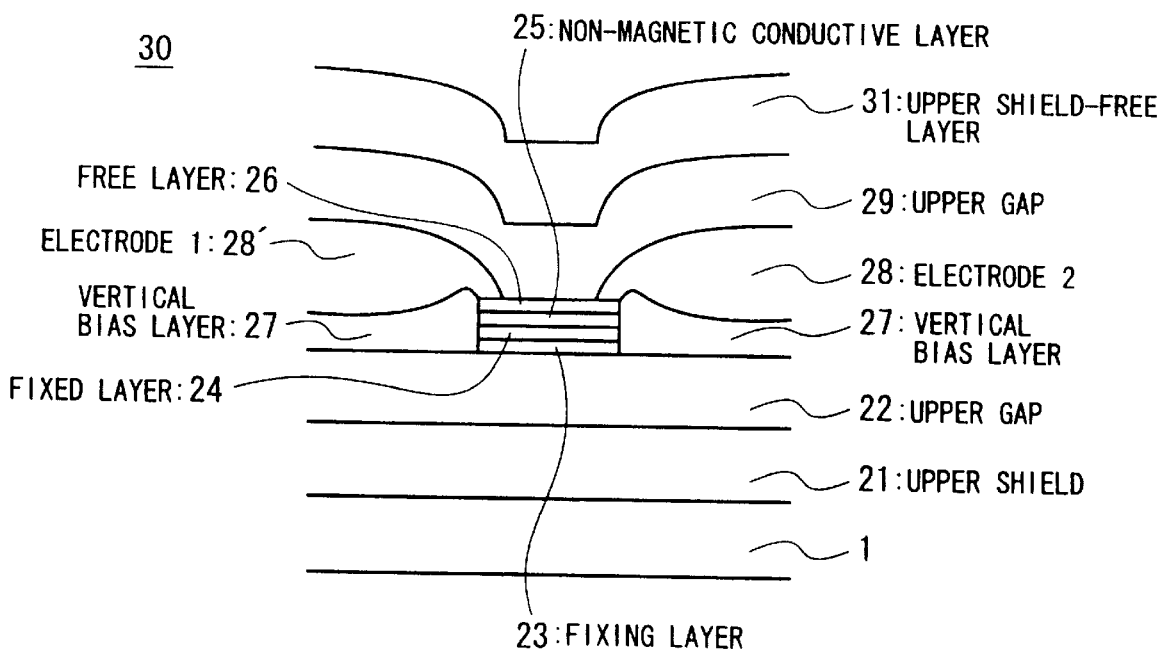

FIG. 6 is a cross-section view illustrating the configuration of an example of a magnetoresistive effect head according to the present invention.

Figure 7:
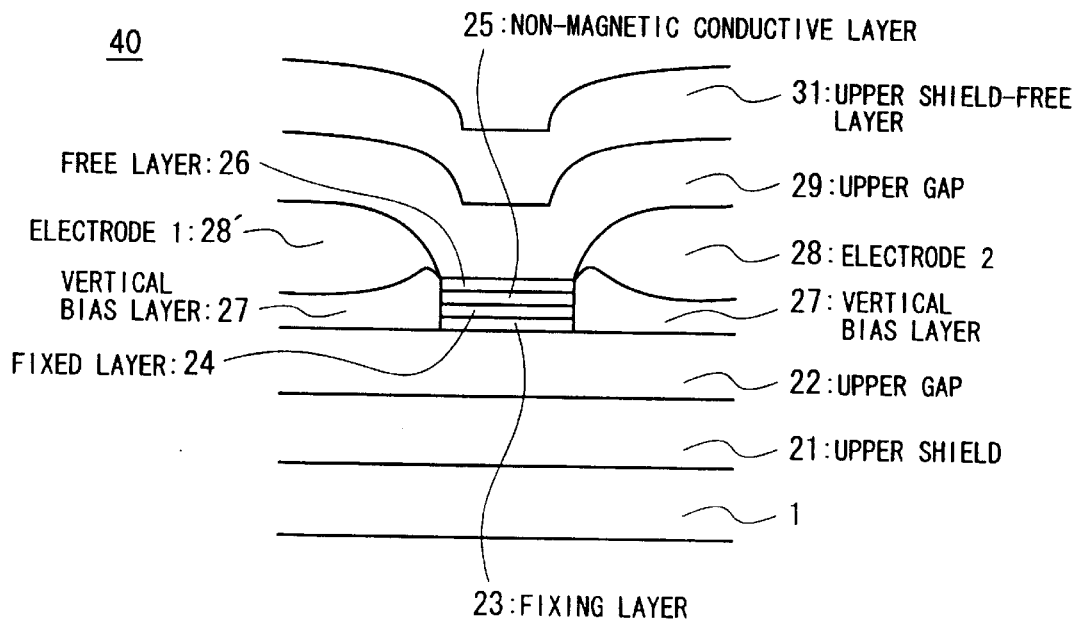

FIG. 7 is a cross-section view illustrating the configuration of another example of a magnetoresistive effect head according to the present invention.

Figure 8:
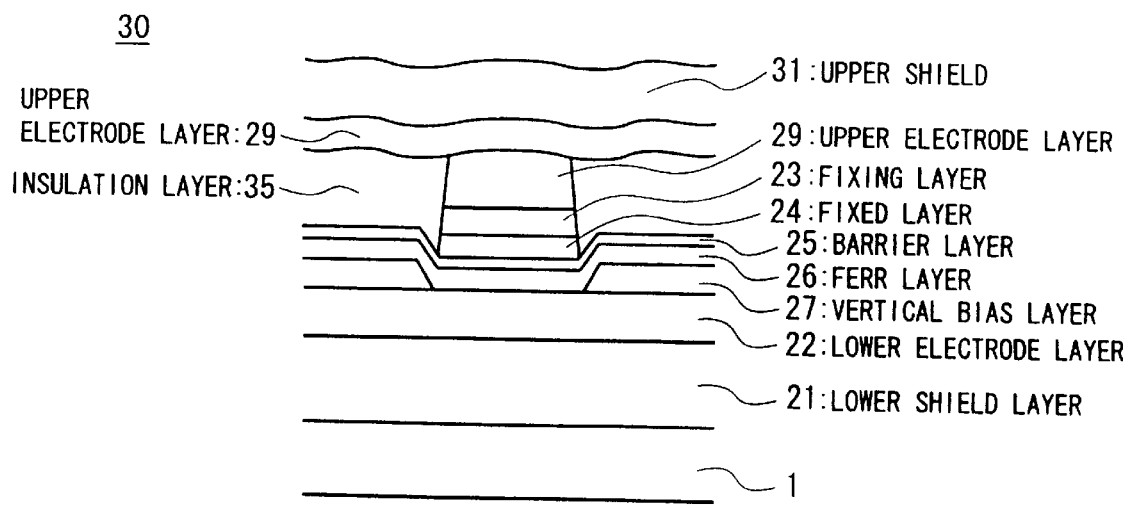

FIG. 8 is a cross-section view illustrating the configuration of yet another example of a magnetoresistive effect head according to the present invention.

DETAILED DESCRIPTION OF THE PREFERRED EMBODIMENTS

Detailed embodiments of a magnetoresistive effect head according to the present invention are described in detail below, with references being made to relevant accompanying drawings.

Figure 1:
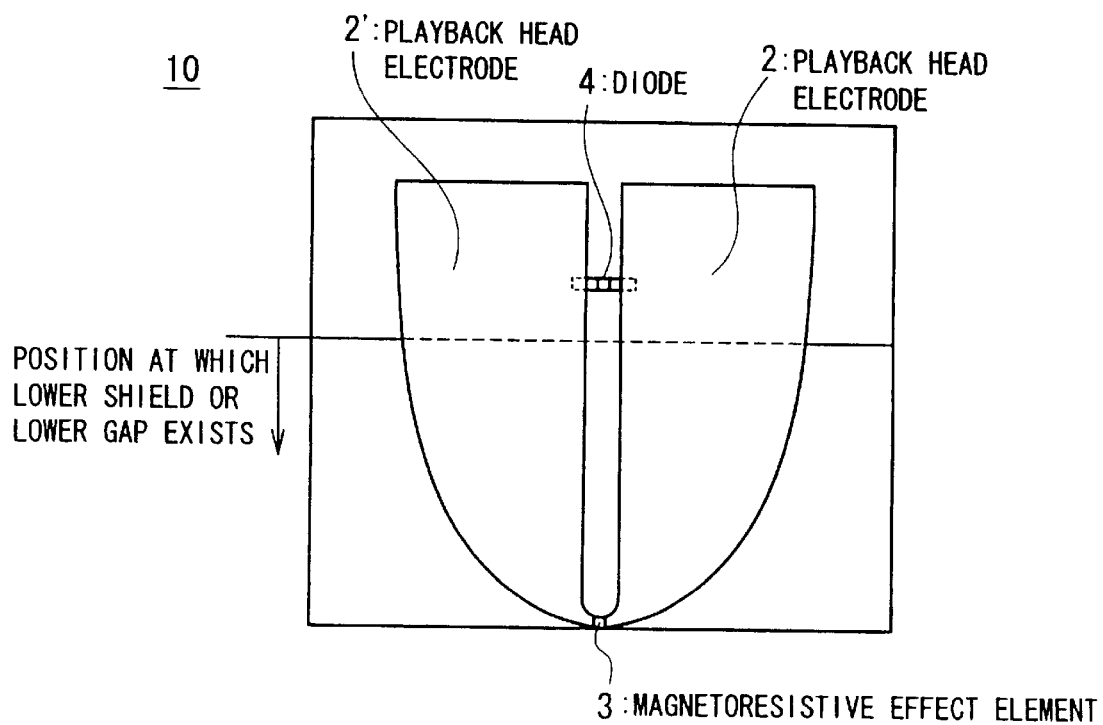
FIG. 1 is a plan view illustrating the general configuration of an example of a magnetoresistive effect head according to the present invention.

Specifically, FIG. 1 illustrates the configuration of an example of a magnetoresistive effect head according to the present invention, this drawing showing a magnetoresistive effect head 10 using as a magnetoresistive sensor a magnetoresistive effect element selected as either a ferromagnetic tunnel junction film or a spin valve film, and being provided with a diode 4 that is connected in parallel with the a first electrode 2 and a second electrode 2' of the magnetoresistive effect element 3.

Additionally, in the present invention it is desirable that the diode 4 be formed on and the same substrate 1, on which the magnetoresistive effect element 3 is provided.

It is further desirable that the diode 4 be formed so as to be buried into the substrate 1 on which is provided the magnetoresistive effect element 3.

Although there is no particular restriction to the configuration of a magnetoresistive effect head 10 using a ferromagnetic tunnel junction film or a magnetoresistive effect head 10 using a spin valve film, an example of the basic configuration of a magnetoresistive effect head 10 using a ferromagnetic tunnel junction film has, as shown in FIG. 6, a ferromagnetic tunnel junction film 30 basically comprising a lower shield layer 21 formed onto a substrate 1, a lower electrode layer 22 part of which is either formed on the lower shield or serves as the lower shield, a layer 23 fixed and formed on the lower electrode layer 22, a fixed layer 24, a barrier layer 25 and a free layer 26, a vertical bias layer 27, at least part of which is either in direct contact with the free layer 26 or separated therefrom by an insulation film interposed therebetween, and an upper electrode layer 29, at least part of which is in contact with the free layer 26 and either disposed below an upper shield 31 or serves also as the upper shield 31. An example of the basic configuration of a magnetoresistive effect head 10 using a spin valve film has, as shown in FIG. 7, a patterned spin valve film 40 basically comprising a lower shield layer 21 formed on a substrate, a fixed layer 23, a fixing film 24, a non-magnetic layer 25, and a free layer 26, patterned electrodes 28 and 28, at least part of which make contact on the left and right as viewed from the ABS surface of the spin valve film 40, a patterned vertical bias layer 27, at least part of which is in contact with the free layer 26, an upper gap layer 29 formed on the spin valve film 40, and an upper shield layer 31 formed on the upper gap layer 29.

As noted above, in the present invention a diode 4 is connected in parallel with the ferromagnetic tunnel junction film 30 or spin valve film 40 between the left and right electrode layers 2 and 2', this diode being disposed and joined on one and the same substrate as the magnetoresistive effect head.

In the present invention, as shown in FIG. 3, it is possible to install the diode 4 on an appropriate suspension 50 for holding the magnetoresistive effect head 10.

The configuration of the diode 4 used in the magnetoresistive effect head 10 according to the present invention and the method of fabricating this diode are illustrated in FIG. 2(A) and FIG. 2(B), in which it is desirable that the diode is so configured that a silicon region layer 41 being formed on the surface of and within the substrate has a prescribed shape, a first conductivity type region 42 having, for example, n-type conductivity being formed with a prescribed shape formed on a surface of and within the silicon region layer 41, and a second conductivity type region 43 having, for example, p-type conductivity, being formed with a prescribed shape within the first conductivity type region 42 and so as to be connected to the region 42, and that there is a second wiring part 44' connected to the second electrode 2' and a first wiring part 44 that is connected to the second conductivity type region 43 and the first electrode 2 and not connected to the first conductivity type region 42.

Additionally, in the present invention it is desirable that the end part of the first wiring part 44 connected to the first electrode 2 be connected to the second conductivity type region 43, and also that the a portion of first electrode 2 other than the end part thereof be extended on the first conductivity type region 42 with an interposed insulation film 45 therebetween.

That is, it is preferable that the diode in the present invention be formed so as to be buried in the magnetic head substrate 1.

When a voltage less than a critical voltage VL is applied to the diode used in the present invention absolutely no current flows. However, when VL is exceeded, the resistance becomes substantially zero, so that current starts flowing suddenly.

If a diode is used in parallel with a head using either a spin valve or a ferromagnetic tunnel junction, even if an excessive voltage is applied to the head terminals, the current passes through the diode, thereby protecting the element.

In a voltage region that does not exceed VL, because the diode resistance is infinite, the sense current flows as normal.

However, because excessive voltage such as from static electricity flows momentarily, in order to provide instantaneous current bypassing, the diode must have sufficiently fast response.

An example of a magnetoresistive effect head 10 according to the present invention is described in further detail below, with references made to relevant drawings.

Figure 2:
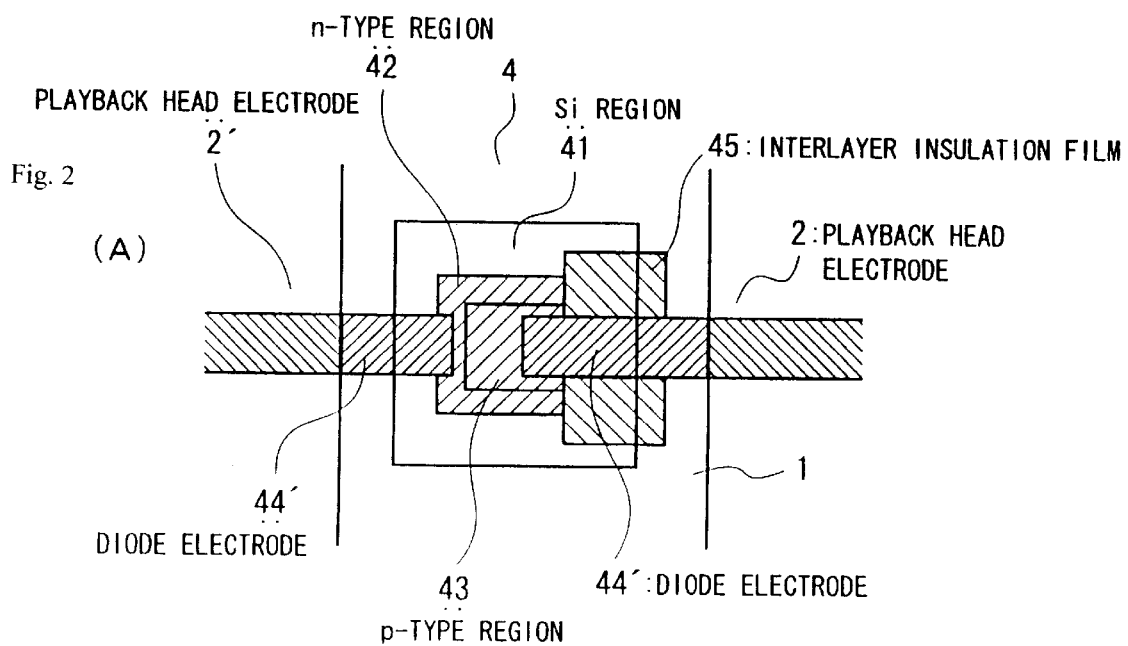
FIG. 2 is a drawing illustrating the configuration of an example of a diode used in a magnetoresistive effect head according to the present invention, FIG. 2(A) being a plan view thereof, and FIG. 2(B) being a cross-section view thereof.

Specifically, FIG. 1 and FIG. 2 illustrate an example of a magnetoresistive effect head 10 according to the present invention. FIG. 1 shows the case in which a diode 4 is inserted between the electrodes 2 and 2' of a playback head.

In this method, it is preferable that a size of the diode 4 should be extremely fine so as to fit with the size of a head and thus it is preferable that the diode should be previously formed on the substrate on which the element is formed.

In this method, because the diode is installed in immediate proximity to the magnetoresistive effect element, it is possible to eliminate all excessive current noise, including noise generated in the lead wires.

FIG. 2 is an enlarged view of the immediate area of the diode that is inserted between the electrodes 2 and 2' of the magnetoresistive effect element 3.

In this case, P-N junction diode is explained as a typical diode.

In this case, a diode 4 is formed between the electrodes 2 and 2' of a playback head.

In the silicon region 41 formed on the substrate 1, an n-type region 42, for example, is formed, and further therewithin is formed, for example, a p-type region 43.

In the drawing, an electrode 44' of a diode connected to the n-type region 42 is in contact with the left side electrode 2' of the playback head 10.

Additionally in the drawing, an electrode 44 of the diode 4 connected to the p-type region 43 is in contact with the right side electrode 2.

An insulation film 45 is formed under the electrode 44, so that contact is not made with the n-type region 42.

Furthermore, the p-type region 43 and the n-type region 44 are selected in accordance with which direction is to be established as the forward direction of the diode 4.

FIG. 3 shows an example of the condition in which the magnetoresistive effect head 10 is mounted to a suspension 50. In this example, the diode 4 is disposed midway in the suspension, and is connected between the two leads 51 lead from the playback electrodes 2 and 2'.

In this method, although the excessive current generated in the area between the connecting part with the diode 4 over the lead wires and the magnetoresistive effect element 3 cannot be completely eliminated, because it is possible to make connection during the suspension assembly process, it is possible to minimize the increase in the number of manufacturing process steps.

Next, an example of a method for mounting the diode in the case of FIG. 1 will be described.

Specifically, for the case of the structure shown in FIG. 1, it is desirable to adopt a method in which, at a position at which the diode electrodes 44 and 44' will be connected to the playback head electrode parts in a downstream head manufacturing process step, a diode 4 is previously fabricated on the substrate 1 at a position which will not be covered by the lower shield and the lower gap.

Figure 4:
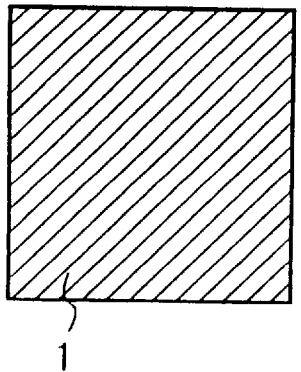
Figure 4:
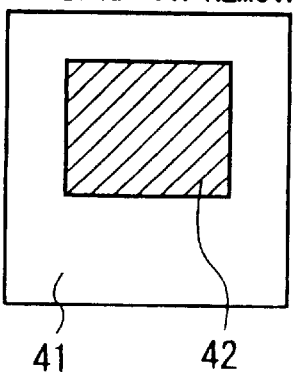
Figure 4:
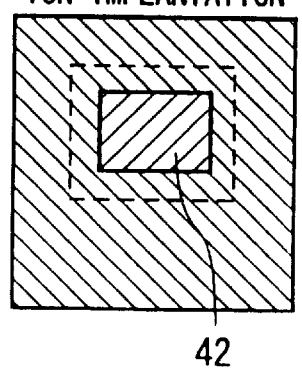
Figure 4:
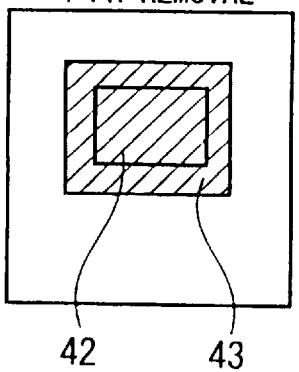
Figure 4:
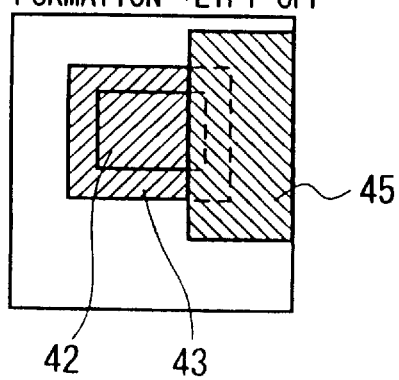
Figure 4:
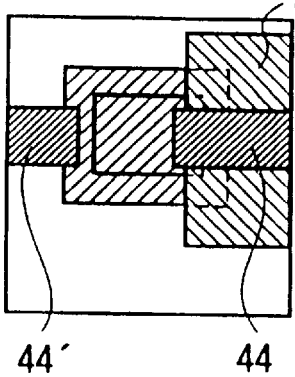
Figure 4:
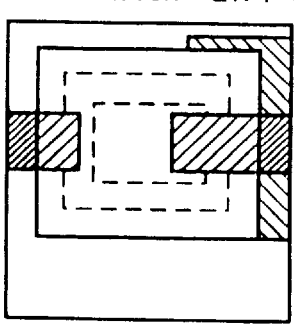

When the above is done, the procedure for fabricating the diode 4 is shown in the example given in FIG. 4.

First, as shown in FIG. 4(A), a silicon layer 41 having high purity is formed on the substrate 1, and n-type ions are implanted in the silicon layer 41 so as to form a prescribed n-type layer 42 on the substrate.

Next, as shown in FIG. 4(B), a PR is formed, and milling is performed to form an element in the silicon, after which the PR is removed.

Then, as shown in FIG. 4(C), a new PR is formed, and p-type ions are implanted into a region that is smaller than the n-type element region formed as shown in FIG. 4(B).

Next, as shown in FIG. 4(D), the above-noted PR is removed, and a p-type region 43 is formed in the area surrounding the n-type element region.

Next, as shown in FIG. 4(E), an interlayer insulation film 45 pattern is formed by a PR formation process and lift-off process, so that there is no shorting between the p-type region 43 and the n-type region 42 by the electrode 44 to be subsequently formed.

Next, as shown in FIG. 4(F), a PR with a prescribed pattern is formed, and a first electrode 44 connected only to the n-type region 42, and a second electrode 44' connected only to the p-type region 43 are formed.

After the above, as shown in FIG. 4(G), a patterned protective layer is formed on the upper surface of the diode element, by means of PR formation and lift-off process. Then, via a series of processes, namely the series in the sequence of playback head fabrication, recording head fabrication, row slicing, ABS surface lapping, DLC growth on the ABS surface, slider processing, mounting to the suspension, and finally wiring, the combined recording/playback head is completed.

In the case of FIG. 3, fabrication is done, for example, as shown in FIG. 5.

In this case, whereas the playback head fabrication, recording head fabrication, row slicing, ABS surface lapping, DLC growth on the ABS surface, slider processing, and mounting to the suspension are the same as in the past, at the subsequent wiring from the head, a pre-fabricated diode element is connected in parallel with the playback element, and mounted to the suspension.

It is also possible to use other types of playback heads, as long as it uses a TMR element or spin valve as the playback element.

A typical magnetoresistive effect element used as a playback element in the present invention is described below.

FIG. 6 is a conceptual cross-section view, showing a ferromagnetic tunnel junction shielded sensor 30 cut parallel to the ABS surface.

In this configuration, a lower shield 21 and a lower electrode layer (lower gap layer) 22 are laminated on the substrate 1.

Next, a free layer 26 and a barrier layer (non-magnetic conductive layer) 25 are laminated over the above structure. More specifically, in the part between the barrier layer 25 and vertical bias layer 27 a fixing layer 23, fixed layer 24, and an upper electrode 29 are laminated, these being patterned as shown in FIG. 6.

The patterned fixed layer 24, fixing layer 23, and upper electrode layer 29 are provided with an insulation layer. Additionally, over this is laminated an upper electrode 29 and an upper shield layer 31.

The base layer, fixing layer, fixed layer, barrier layer, and free layer parts constitute a ferromagnetic tunnel junction film.

In the above-noted configuration, if a current is assumed to be flowing from the upper electrode 29 to the lower electrode 22 as shown in the drawing, the current will flow from the upper electrode, and then to the layer to be fixed, the fixed layer, the barrier layer, and finally to the lower electrode.

When the above occurs, the vertical bias layer 27 is not in the path of the current flow. Additionally, because the vertical bias layer 27 is directly laminated onto the free layer 26, the vertical bias is sufficiently applied to the free layer 26.

By using the above-noted configuration, therefore, it is possible to achieve not only proper flow of sense current in the ferromagnetic tunnel junction part, but also proper application of vertical bias to the free layer.

While in the above description the construction is one in which the lower electrode 22 is laminated onto the lower shield layer 21 and the upper shield 31 is laminated onto the upper electrode 29, it is also possible to place an insulation film as a gap layer between the lower shield 21 and the lower electrode 22 or between the upper electrode 29 and the upper shield 31.

It is further possible to combine the lower shield 21 with the lower electrode 22 or the upper electrode 29 with the upper shield 31.

Additionally, it is possible to provide a separate base layer between the lower electrode layer 22 and the free layer 26, and to provide an upper layer between the anti-ferromagnetic layer that forms the free layer 26 and the upper electrode layer 29.

FIG. 7 is a conceptual cross-section view, showing a shielded sensor 40 for the case of using a spin valve as a magnetoresistive effect element, cut parallel to the ABS surface.

In this configuration, a lower shield 21 and a lower electrode layer 22 are laminated on the substrate 1.

Over the above are formed a fixing layer 23, a fixed layer 24, a non-magnetic layer 25, and a free layer 26, these being patterned as shown in the drawing, and a vertical bias layer 27 and electrode 28 being disposed to the left and right thereof.

Additionally, over the above structure is formed an upper gap layer 29 and an upper shield layer 31.

It is also possible to provide a lower gap layer on the lower electrode, and further possible to provide a base layer between the lower gap layer and the layer 23 to be fixed, and provide an upper layer between the free layer 26 and the upper gap layer 29.

While the above description, reflected in FIG. 7, is for the case in which successive laminations from the bottom are made in sequence starting with the fixing layer 23 and proceeding through the fixed layer 24, the non-magnetic conductive layer 25, and then the free layer 26, it is also possible to make successive laminations from the bottom in the sequence starting with the free layer, and proceeding to the non-magnetic conductive layer, the fixed layer, and finally the fixing layer.

In the above-noted case, the it is possible to provide a base layer between the free layer and the lower gap layer and to provide an upper layer between the layer to the fixed and the upper gap layer.

FIG. 8 is a conceptual cross-section view showing the structure of another example of a ferromagnetic tunnel junction shielded sensor 30, cut parallel to the ABS surface.

In the configuration of FIG. 8, a lower shield, a lower electrode, an antimagnetic layer, a fixed layer, and a barrier layer are successively laminated onto the substrate 1, over which a patterned free layer 26 as shown in the drawing is then laminated.

On the left and right of the free layer 26 are disposed an insulation film 35 and a vertical bias layer 27, the end parts of which are in contact with the free layer 26.

Additionally, an upper electrode layer 29 and an upper shield layer 31 are laminated over the above structure.

As can be understood from FIG. 8, the base layer (not shown in the drawing), fixing layer 29, fixed layer 24, barrier layer 25 and free layer 26 constitute a ferromagnetic tunnel junction film 30.

Because the vertical bias film 27 is in contact with the free layer 26, the vertical bias is sufficiently applied to the free layer 26.

By using the above-described structure, therefore, it is possible to achieve not only proper flow of sense current in the ferromagnetic tunnel junction part, but also proper application of vertical bias to the free layer.

While in the above description the configuration is one in which the lower electrode is laminated onto the lower shield, and the upper shield is laminated onto the upper electrode, it is also possible to place an insulation film as a gap layer between the lower shield 21 and the lower electrode or between the upper electrode and the upper shield.

It is further possible to provide a base layer between the lower electrode layer and the free layer, and to provide an upper layer between the antimagnetic layer and the upper electrode layer. Additionally, the foregoing description was for the case in which, of the ferromagnetic tunnel junction film only the free layer was patterned, it is possible to pattern minimally the free layer, with part therebelow either patterned or not patterned, as appropriate.

In the magnetoresistive effect elements 30 and 40 shown in FIG. 6 and FIG. 7, if we assume that current is flowing from the upper electrode 29 to the lower electrode 22 shown in these drawings, the current passes successively from the upper electrode 29 and then to the free layer, the barrier layer, the fixed layer, and then to the layer to be fixed, and finally to the lower electrode layer.

When the above occurs, because the vertical bias layer 27 is electrically insulated from the fixed layer and lower layers by the insulation film 35 and barrier layer 25, it does not contribute to the flow of current.

Next, the elements making up these heads will be described in detail. The following materials are suitable candidates for materials in the elements making up each layer.

Base
  AlTiC, SiC, alumina, AlTiC/alumina, SiC/alumina
Lower Shield Layer
  NiFe, CoZr, or single or multiple layers or a mixture of CoFeB, CoZrMo, CoZrNb, CoZr, CoZrTa, CoHf, CoTa, CoTaHf, CoNbHf, CoZrNb, CoHfPd, CoTaZrNb, CoZrMoNi alloy, FeAlSi, ferrous nitride material, MnZn ferrite, NiZn ferrite, and MgZn ferrite.
Lower Electrode Layer
  Single or multiple layers or mixture of Au, Au, Cu, Mo, W, Y, Ti, Zr, Hf, V, Nb, Pt, or Ta.
Boundary Control Layer
  Single or multiple layers or mixture of Al oxide, Si oxide, aluminum nitride, silicon nitride, diamond like carbon, Au, Ag, Cu, Mo, W, Y, Ti, Zr, Hf, V, Pt, Nb, and Ta.
Upper Electrode Layer
  Single or multiple layers or mixture of Au, Ag, Cu, Mo, W, Y, Pt, Ti, Zr, Hf, V, Nb, or Ta.
Upper Shield Layer
  NiFe, CoZr, or single or multiple layers or a mixture of CoFeB, CoZrMo, CoZrNb, CoZr, CoZrTa, CoHf, CoTa, CoTaHf, CoNbHf, CoZrNb, CoHfPd, CoTaZrNb, CoZrMoNi alloy, FeAlSi, ferrous nitride material, MnZn ferrite, NiZn ferrite, and MgZn ferrite.
Insulation Layer
  Single or multiple layers or mixture of Al oxide, Si oxide, aluminum nitride, silicon nitride, and diamond like carbon.
Lower Gap Layer
  Single or multiple layers or mixture of Al oxide, Si oxide, aluminum nitride, silicon nitride, and diamond like carbon.
Upper Gap Layer
  Single or multiple layers or mixture of Al oxide, Si oxide, aluminum nitride, silicon nitride, and diamond like carbon.
Upper Layer
  Single or multiple layers of mixture of Au, Ag, Cu, Mo, W, Y, Ti, Pt, Zr, Hf, V, Nb, and Ta.
Vertical Bias Layer
  Single or multiple layers or mixture of CoCrPt, CoCr, CoPt, CoCrTa, FeMn, NiMn, Ni oxide, NiCo oxide, Fe oxide, NiFe oxide, IrMn, PtMn, PtPdMn, ReMn, Co ferrite, and Ba ferrite.

The following materials can be used as a magnetoresistive effect layer.

base layer/lower layer/free layer/first MR enhancement layer/non-magnetic layer/second MR enhancement layer/fixed layer/fixing layer/protective layer, base layer/lower layer/fixing layer/fixed layer/first MR enhancement layer/non-magnetic layer/second MR enhancement layer/free layer/protective layer, base layer/lower layer/first fixing layer /first fixed layer/first MR enhancement layer/non-magnetic layer/second MR enhancement layer/free layer/third MR enhancement layer/non-magnetic layer/fourth MR enhancement layer/second fixed layer/second fixing layer/protective layer, base layer/lower layer/fixed layer/first MR enhancement layer/non-magnetic layer/second MR enhancement layer/free layer/protective layer, and base layer/lower layer/fixed layer/first MR enhancement layer/non-magnetic layer/second MR enhancement layer/fixed layer/protective layer.

And as the lower layer, a single or multiple layer or mixture of a metal, oxide, or a nitride can be used.

More specifically, a single layer, mixture, or multiple layer of Ta, Hf, Zr, W, Cr, Ti, Mo, Pt, Ni, Ir, Cu, Ag, Co, Zn, Ru, Rh, Re, Au, Os, Pd, Nb, V, or a oxide or nitride thereof is used. It is possible to use Ta, Hf, Zr, W, Cr, Ti, Mo, Pt, Ni, Ir, Cu, Ag, Co, Zn, Ru, Rh, Re, Au, Os, Pd, Nb, and V as added elements. There are cases in which a lower layer is not used.

It is possible to use NiFe, CoFe, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb, CoZrMoNi alloy or an amorphous magnetic material as the free layer.

The candidates for use as a non-magnetic material will differ between the case in which the magnetoresistive film is a ferromagnetic tunnel junction film and the case in which a conductive non-magnetic layer is used as the non-magnetic layer of the magnetoresistive film.

As non-magnetic film (barrier film) of a ferromagnetic tunnel junction film, an oxide, nitride, mixture of an oxide and a nitride, or a two layer metal/oxide film, two layer metal/nitride film, or two layer metal/oxide-nitride mixture is used.

Suitable candidates for the above are single oxides and nitrides, or multi layers or mixtures of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re and V or a lamination of the above with a single oxide and nitride, two layers, or mixture of Ti, V, Cr, Co, Cu, Zn, Y, Zr, Nb, Mo, To, Ru, Rh, Pd, Ag, Hf, Ta, W, Re, Os, Ir, Pt, Au, Si, Al, Ti, Ta, Pt, Ni, Co, Re and V.

In the case of a magnetoresistive effect film using a conductive non-magnetic film as the non-magnetic film, single and multi layers or mixtures of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re and V or a lamination of the above with a single or multi layer or mixture of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re and V.

As the first and the second MR enhancement layers, Co, NiFeCo, FeCo or the like, CoFeB, CoZrMo, CoZrNb, CoZr, CoZrTa, CoHf, CoTa, CoTaHf, CoZrNb, CoHfPd, CoTaZrNb, CoZrMoNi alloy or an amorphous magnetic material is used. In the case in which an MR enhancement layer is not used, compared to the case in which one is used, although the MR ratio is slightly reduced, the fabrication steps are commensurately reduced.

As the fixed layer, NiFe, Co Fe, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb, CoZrMoNi alloy or an amorphous magnetic material is used.

It is also possible to use a single, an alloy or laminate of the above substances with Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re and V, as a base.

Suitable candidates are Co/Ru/Co, CoFe/Ru/CoFe, CoFeNi/Ru/CoFeNi, Co/Cr/Co, CoFe/Cr/CoFe, and CoFeNi/Cr/CoFeNi.

As a fixing layer, FeMn, NiMn, IrMn, RhMn, PtPdMn, ReMn, PtMn, PtCrMn, CrMn, CrAl, TbCo, Ni oxide, Fe oxide, an mixture of Ni oxide and Co oxide, a mixture of Ni oxide and Fe oxide, a double Ni oxide/Co oxide layer, a double Ni oxide/Fe oxide layer, CoCr, CoCrPt, CoCrTa, or PtCo or the like is used.

Suitable candidates are PtMn or PtMn with an additive of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, or Ti.

As a protective layer, an oxide, nitride, mixture of an oxide and a nitride, or a double metal/oxide layer, double metal/nitride layer, or double metal/(oxide-nitride mixture) layer is used.

Suitable candidates are single, multi layers or mizture of oxide or nitride of Ti, V, Cr, Co, Cu, Zn, Y, Zr, Nb, Mo, To, Ru, Rh, Pd, Ag, Hf, Ta, W, Re, Os, Ir, Pt, Au, Si, Al, Ti, Ta, Pt, Ni, Co, Re and V or a lamination of the above with a single or multi layers or mixture of a nitride or oxide or mixture of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ti, Ta, Pt, Ni, Co, Re and V.

There are cases in which a protective film is not used.

An embodiment of a magnetoresistive effect head according to the present invention is described in further detail below.

Specifically, using a shielded spin valve head as a playback head 10, a prototype of a head having the structure shown in FIG. 1 and FIG. 2 was made.

In doing this, the diode was fabricated by diffusing P (phosphorus) into the epitaxially grown silicon on the substrate to form an n-type region, into which B (boron) was ion implanted.

The insulation layer was formed as a 100-nm layer of alumina, and Ta (3 nm)/Cu (40 nm) Ta (3 nm) was used for the diode wiring.

The avalanche voltage of the diode (voltage at which the resistance of a diode to which a voltage has been applied suddenly becomes small) was made 25 V.

As the magnetoresistive film, Ta (3 nm)/Pt46Mn54 (15 nm)/Co90Fe10 (1.5 nm)/Ru (0.8 nm)/Co90Fe10 (2 nm)/Cu (2.1 nm)/Co90Fe10 (0.5 nm)/Ni82Fe18 (4 nm)/Ta (3 nm) was used.

After film formation, thermal treating was done at 250° C. for 5 hours, with a magnetic field of 5 kOe applied in a direction perpendicular to the direction of the field at the time of film formation.

The elements making up the head were as follows.

Base layer: Alumina laminated to a thickness of 10 µm onto a 2-nm-thick AlTiC layer.

Playback Head Part
  Lower shield layer: Co89Zr4Ta4Cr3 (1 µm) (composition given as at % here and hereafter).
  Lower gap layer: Alumina (20 nm)
  Lower gap thickening layer: Alumina (40 nm)
  Electrode layer: Ta (1.5 nm)/Au (40 nm)/Ta (3 nm)
  Electrode gap thickening layer: Ta (1.5 nm)/Au (100 nm)/Ta (3 nm)
  Insulation layer: Alumina (20 nm)
  Vertical bias layer: Cr (5 nm)/Co74.5Cr10.5Pt15 (15 nm)
  Upper gap layer: Alumina (40 nm)
  Upper gap thickening layer: Alumina (40 nm)
  Upper shield layer: Common with the lower pole of the recording head (common pole)

Recording Head Part
  Common pole underlayer: Ni82Fe18 (90 nm)
  Common pole: Ni82Fe18 (2.5 µm)/Co65Ni12Fe23 (0.5 µm)
  Recording gap: Alumina (0.3 µm)
  Gap thickening: Alumina (0.7 µm)
  Coil underlayer: Cr (30 nm)/Cu (150 nm)
  Coil: Cu (4.5 µm)
  Upper pole underlayer: Ti (10 nm)/Co65Ni12Fe23 (0.1 µm)
  Upper pole: Co65Ni12Fe23 (0.5 µm)/Ni82Fe18 (3.5 µm)
  Terminal underlayer: Cr (30 nm)/Cu (150 nm)
  Terminal: Cu (50 µm)
  Overcoat: Alumina (52 µm)
  Gold terminal underlayer: Ti (10 nm)/Ni82Fe18 (0.1 µm)
  Gold terminal: Au (3 µm)

The sequence of fabricating the head is described below.

Example of General Process Steps for Fabricating the Diode

For example, the diode was fabricated by following the sequence of process steps given below.

Substrate washing→Si epitaxial growth→p ion implantation→Si patterning (PR formation→milling→PR removal)→PR formation→B ion implantation→PR removal→electrode formation (PR formation→electrode film formation→lift-off).

Example of General Process Steps for Fabricating the Playback Head

For example, the playback head was fabricated by following the sequence of process steps given below.

Lower shield formation and annealing→alignment mark formation (PR formation→patterning→resist removal) →lower shield patterning (PR formation→tapering→resist removal)→lower gap formation (PR formation→film growth→lift-off)→lower gap thickening (PR formation→film growth→lift-off)→formation of underlayer, free layer, non-magnetic layer, fixed layer, layer to be fixed, and protective layer→patterning of underlayer, free layer, non-magnetic layer, fixed layer, and layer to be fixed (PR formation→milling)→growing of vertical bias layer and electrode layer→lift-off→patterning of vertical bias layer and electrode layer (PR formation→milling) →electrode thickening formation (PR formation→film growth→lift-off)→pole height monitor formation (PR formation→film growth→lift-off)→upper gap formation (PR formation→film growth→lift-off)→upper gap thickening formation (PR formation→film growth→lift-off).

Example of General Process Steps for Fabricating the Recording Head

For example, the playback head was fabricated by following the sequence of process steps given below.

Common pole formation (second underlayer formation→frame PR formation→common pole plating→cover PR formation→chemical etching→underlayer removal)→pole height hole filling resist→gap film growth→gap thickening formation (PR formation→film growth→lift-off)→PW (pole for electrically connecting the upper pole and the common pole) formation (PR formation→milling→PR removal)→coil formation SC1 resist (first resist for protecting the coil insulation) formation→coil formation (underlayer film formation→PR formation→coil plating→chemical etching→underlayer removal)→SC2 resist (second resist for protecting the coil insulation) formation→gap adjustment milling→upper pole formation (underlayer film formation→frame resist formation→upper pole plating→plating annealing→underlayer removal→cover PR formation→chemical etching→underlayer removal) →terminal formation (underlayer film growth→PR formation→terminal plating→chemical etching→underlayer removal)→overcoat film growth→terminal lapping→gold terminal plating (underlayer film growth→PR formation→gold terminal plating→underlayer removal).

The photoresist curing step when fabricating the coil of the recording head is performed at 250° C. for 2 hours. Because by this step, there is rotation of the fixed layer and layer to be fixed, which should be facing in the direction of the element height, so that proper operation as a magnetoresistive effect element is not achieved, after completing fabrication of the playback head and recording head, thermal magnetization is done at 200° C. in a magnetic field of 500 Oe. Almost no rotation toward the easy magnetization axis of the free layer by this thermal magnetization processing was observed.

Post-Processing

Row slicing→ABS surface lapping→DLC film growth on the ABS surface→slider processing→mounting to the suspension→wiring from the head.

Using a head fabricated as described above, data was recorded to and played back from a CoCrTa recording medium. When this was done, the recording track width was 1.5 μm, the recording gap was 0.2 μm, and the playback track width was 0.5 μm.

The recording medium coercivity was 5.0 kOe, and the MrT was 0.3 memu/cm2.

Using the prototype head, the results of ESD tests were as follows.

Whereas in the case in the past in which a diode was not installed there was element destruction before the MR ratio reached zero at a test voltage of approximately 30 mV, with a diode installed there was an improvement in characteristics up to 80 mV.

In principle, there should not be element destruction even with a further increase in test voltage. However, when the test voltage was increased beyond 80 mV in this case, the element was destroyed and the MR ratio dropped to almost zero although the cause of this is not clear.

| Test voltage (V) | MR Ratio |
| --- | --- |
| 0 | 1.6 |
| 25 | 1.6 |
| 30 | 1.6 |
| 50 | 1.6 |
| 80 | 1.6 |
| 100 | 0.4 |
| 150 | 0.0 |

Next, using a shielded spin valve head as the playback head, a prototype of a head having the construction shown in FIG. 3 was fabricated. The prototype parameters and the test process were the same as noted above, with the exception that there was no pre-fabrication of the diode and no accompanying process step to connect the diode at the final stage.

The avalanche voltage of the diode was made 25 V. Using this head, data was recorded to and played back from a CoCrTa recording medium. When this was done, the recording track width was 1.5 μm, the recording gap was 0.2 μm, and the playback track width was 0.5 μm.

The recording medium coercivity was 5.0 kOe, and the MrT was 0.35 memu/cm$^2$.

Using the prototype head, the results of ESD tests were as follows.

Whereas in the case in the past in which a diode was not installed there was element destruction before the MR ratio reached zero at a test voltage of approximately 30 mV, with a diode installed there was an improvement in withstand voltage characteristics up to 80 mV.

| Test voltage (V) | MR Ratio |
| --- | --- |
| 0 | 1.6 |
| 25 | 1.6 |
| 30 | 1.6 |
| 50 | 1.6 |
| 80 | 1.6 |

-continued

| Test voltage (V) | MR Ratio |
|---|---|
| 100 | 0.4 |
| 150 | 0.0 |

Next, using a ferromagnetic tunnel junction shielded head as the playback head, a head was prototyped according to the present invention.

Aprototype head having the construction shown in FIG. 1 and FIG. 3 was fabricated. With the exception of the playback part, the process steps for fabrication are the quivalent of those for the spin valve head. When the applied voltage was increased, the voltage at which the diode resistance increased sharply was made 1 V.

Ta (3 nm)/Pt46Mn54 (15 nm)/Co90DFe10 (1.5 nm)/Ru (0.8 nm)/Co90Fe10 (2 nm)/Cu (2.1 nm)/Co90Fe10 (0.5 nm)/Ni82Fe18 (4 nm)/Ta (3 nm) was used as the magnetoresistive film.

After film formation, thermal treating was done at 250° C. for 5 hours, with a magnetic field of 5 kOe applied in a direction perpendicular to the direction of the field at the time of film formation.

The elements making up the head were as follows.
Base layer: Alumina laminated to a thickness of 10 $\mu$m onto a 2-nm-thick AlTiC layer.
Playback Head Part
  Lower shield layer: Co89Zr4Ta4Cr3 (1 $\mu$m) (composition given as at % here and hereafter).
  Lower gap layer: None
  Lower gap thickening layer: None
  Electrode layer: Ta (1.5 nm)/Pt (40 nm)/Ta (3 nm)
  Electrode gap thickening layer: Ta (1.5 nm)/Au (100 nm)/Ta (3 nm)
  Insulation layer: Alumina (20 nm)
  Vertical bias layer: Cr (3 nm)Co74.5Cr10.5Pt15 (15 nm)
  Lower electrode layer: Ta (1.5 nm)/Au (40 nm)/Ta (3 nm)
  Lower electrode thickening layer: Ta (1.5 nm)/Au (100 nm)/Ta (3 nm)
  Upper gap layer: None
  Upper gap thickening layer: None
  Upper shield layer: Common with the lower pole of the recording head (common pole)
Recording Head Part
  Common pole underlayer: Ni82Fe18 (90 nm)
  Common pole: Ni82Fe18 (2.5 $\mu$m)/Co65Ni12Fe23 (0.5 $\mu$m)
  Recording gap: Alumina (0.3 $\mu$m)
  Gap thickening: Alumina (0.7 $\mu$m)
Coil underlayer: Cr (30 nm)/Cu (150 nm)
Coil: Cu (4.5 $\mu$m)
Upper pole underlayer: Ti (10 nm)/Co65Ni12Fe23 (0.1 $\mu$m)
Upper pole: Co65Ci12Fe23 (0.5 m)/Ni82Fe18 (3.5 $\mu$m)
Terminal underlayer: Cr (30 nm)/Cu (150 nm)
Terminal: Cu (50 $\mu$m)
Overcoat: Alumina (52 $\mu$m)
Gold terminal underlayer: Ti (10 nm)/Ni82Fe18 (0.1 $\mu$m)
Gold terminal Au (3 $\mu$m)

Using a head fabricated as described above, data was recorded to and played back from a CoCrTa recording medium. When this was done, the recording track width was 5 $\mu$m, the recording gap was 0.2 $\mu$m, and the playback track width was 0.5 $\mu$m.

The recording medium coercivity was 5.0 kOe, and the MrT was 0.35 memu/cm$^2$.

Using the prototype head, the results of ESD tests were as follows.

Whereas in the case in the past in which a diode was not installed there was element desctruction before the MR ratio reached zero at a test voltage of approximately 2 V, with a diode installed there was an improvement in withstand voltage characteristics up to 10 V.

| Test voltage (V) | MR Ratio |
|---|---|
| 0 | 2.5 |
| 1 | 2.5 |
| 2 | 2.5 |
| 5 | 2.5 |
| 10 | 2.5 |
| 15 | 0.0 |
| 20 | 0.0 |

Next, using a shielded TMR head as the playback head, a prototype of a head having the construction shown in FIG. 3 was fabricated. The prototype parameters and the test process were the same as noted above, with the exception that there was no pre-fabrication of the diode and no accompanying process step to connect the diode at the final stage.

The voltage at which the diode resistance drops was made 1 V.

Compared with the configuration shown in FIG. 1, in which there is an integral diode, the MR ratio became zero at a slightly lower voltage of 10 V.

It is thought that, in contrast to the configuration in which a diode is installed immediately next to the playback head, if the diode is at a distance, as shown in FIG. 3, there is a slight loss of diode biasing effect because of the influence of the wiring resistance, the capacitor and the coil. However, because there was element destruction in the past at 2 V, it is still seen that there is a great improvement in ESD test characteristics, as given below.

| Test voltage (V) | MR Ratio |
|---|---|
| 0 | 2.5 |
| 1 | 2.5 |
| 2 | 2.5 |
| 5 | 2.5 |
| 8 | 2.5 |
| 10 | 0.0 |
| 15 | 0.0 |

A magnetic disk apparatus to which the present invention is applied is described below.

A magnetic disk apparatus has three magnetic disks provided on a base, with a head drive circuit, a signal processing circuit, and an input/output interface housed on the rear surface of the base.

A 32-bit bus line makes connections to the outside. Six heads are disposed on both surfaces of the magnetic disks. A rotary actuator for driving the heads, the associated drive and control circuits, and a directly coupled spindle motor for rotationally driving the disks are also provided. The disk diameter in 46 mm, and the diameter of the disk active surface ranges from 10 mm to 40 mm.

Using a buried servo system, because there is no servo surface, it is possible to achieve high density. This apparatus can be connected as an external memory apparatus for a small computer.

The input/output interface has a cache memory, which can accommodate a transfer rate in the range from 5 to 20 megabytes per second. By using an external controller and connecting a plurality of these apparatuses, it is possible to configure a large-capacity magnetic disk apparatus memory bank.

As is clear from the above descriptions, a specific example of a method for manufacturing a magnetoresistive effect head according to the present invention is one in which a magnetoresistive effect element made from a film that is either a ferromagnetic tunnel junction film or a spin valve film is disposed onto a magnetic head substrate, whereby a diode is buried into the magnetic head substrate, after which the diode is connected in parallel with the first electrode and the second electrode of the magnetoresistive effect element.

Additionally, in a method for manufacturing a magnetoresistive effect head according to the present invention, it is desirable that the diode be formed on one and the same substrate as the magnetoresistive effect element.

More specifically, a method for manufacturing a magnetoresistive effect head according to the present invention has a step of forming on the substrate surface and therewithin a silicon layer having a prescribed shape, a step of forming a first conductivity type region of a prescribed shape on the surface of the silicon layer and therewithin, a step of forming a second conductivity type region having a prescribed shaped within the first conductivity type region, a step of forming a first electrode connected to the first conductivity type region, and a step of forming a second electrode connected to the second conductivity type region and not connected to the first conductivity type region extending over the first conductivity type region via an interposing insulation film therebetween.

In the present invention, it is possible to obtain a magnetoresistive detection system having the above-noted magnetoresistive effect head, means for generating a current passing through a magnetoresistive sensor formed by a magnetoresistive effect element of the magnetoresistive effect head, and means for detecting a change in the resistivity of the magnetoresistive sensor as a function of the detected magnetic field. It is further possible to obtain with the present invention a magnetic storage system having a magnetic recording medium with a plurality of tracks for recording data, means for magnetically recording data onto the magnetic recording medium, and an actuator means for moving the above-noted magnetoresistive effect head, the magnetoresistive detection system, and the magnetic recording means to a selected track of the magnetic recording medium.

By adopting the technical constitution described in detail above, a magnetoresistive effect head according to the present invention enables manufacture of a magnetoresistive sensor with a high playback output and a high manufacturing yield.

What is claimed is:

1. A magnetoresistive effect head which uses as a magnetic resistance sensor a magnetoresistive effect element selected from a group consisting of a ferromagnetic tunnel junction film and a spin valve film, comprising:
   a first electrode and a second electrode of said magnetoresistive effect element; and
   a diode connected in parallel with said first and second electrodes,
   wherein said diode and the magnetoresistive effect element are formed on a same susbstrate, and
   wherein said diode is formed so as to be buried within said substrate on which is provided said magnetoresistive effect element.

2. A magnetoresistive detection system comprising:
   said magetoresistive effect head according to claim 1;
   means for generating a current passing through said magnetic resistance sensor formed by said magnetoresistive effect element of said magnetoresistive effect head; and
   means for detecting a change in a resistivity of said magnetic resistance sensor as a function of a detected magnetic field.

3. A magnetic storage system comprising:
   a magnetic recording medium with a plurality of tracks for recording data;
   means for magnetically recording data onto said magnetic recording medium;
   said magnetoresistive effect head according to claim 1; and
   an actuator means for moving said magnetoresistive effect head;
   a magnetoresistive detection system; and
   said magnetic recording means to a selected track of said magnetic recording medium.

4. A magnetoresistive effect head which uses as a magnetic resistance sensor a magnetoresistive effect element selected from a group consisting of a ferromagnetic tunnel junction film and a spin valve film, comprising:
   a first electrode and a second electrode of said magnetoresistive effect element; and
   a diode connected in parallel with said first and second electrodes,
   wherein said diode has a silicon layer of a prescribed shape formed on a surface of and within said substrate, a first conductivity type region of a prescribed shape having a first conductivity type, being formed on a surface of and within said silicon region, and a second conductivity type region having a second conductivity type and having a prescribed shape being formed in said first conductivity type region, wherein said first electrode is connected to said first conductivity type region and said second electrode is connected to said second conductivity type region and not connected to said first conductivity type region.

5. A magnetoresistive effect head according to claim 4, wherein an end part of said second electrode is connected to the second conductivity type region, and further wherein said second electrode other than said end part extends on said first conductivity type region with an interposed insulation film.

6. A magnetoresistive detection system comprising:
   said magnetoresistive effect head according to claim 5;
   means for generating a current passing through said magnetic resistance sensor formed by said magnetoresistive effect element of said magnetoresisfive effect head; and
   means for detecting change in a resistivity of said magnetic resistance sensor as finction of a detected magnetic field.

7. A magnetic storage system comprising:
   a magnetic recording medium with a plurality of tracks for recording data;
   means for magnetically recording data onto said magnetic recording medium;
   said magnetoresistive effect head according to claim 5; and
   an actuator means for moving said magnetoresistive effect head;

a magnetoresistive detection system; and said magnetic recording means to a selected track of said magnetic recording medium.

8. A magnetoresistive detection system comprising:

said magnetoresistive effect head according to claim 4;

means for generating a current passing through said magnetic resistance sensor formed by said magnetoresistive effect element of said magnetoresistive effect head; and means for detecting a change in a resistivity of said magnetic resistance sensor as a function of a detected magnetic field.

9. A magnetic storage system comprising:

a magnetic recording medium with a plurality of tracks for recording data;

means for magnetically recording data onto said magnetic recording medium;

said magnetoresistive effect head, according to claim 4; and an actuator means for moving said magnetoresistive effect head;

a magnetoresistive detection system; and said magnetic recording means to a selected track of said magnetic recording medium.

10. A magnetic effect head which uses as a magnetic resistance sensor a magnetoresistive effect element selected from a group consisting of a ferromagnetic tunnel junction film and a spin valve, comprising:

a first electrode and a second electrode of said magnetoresistive effect element; and a diode installed adjacent and connected in parallel with said first electrode and said second electrode, and wherein said diode is formed so as to be buried within a substrate on which is provided said magnetotesistive effect element.

* * * * *